2,980,638
ALUMINUM-CONTAINING NON-LEAFING ALKYD RESIN PROTECTIVE COATING

Walter Polovina, Schenectady, N.Y., assignor to General Electric Company, a corporation of New York No Drawing. Filed June 17, 1957, Ser. No. 666,245

5 Claims. (Cl. 260—22)

This invention relates to a protective coating composition suitable for providing protection against corrosion for metal surfaces to which it has been applied.

For many years it has been common practice in protecting iron or steel surfaces from corrosion to coat the surface with a primer coat and, after suitable drying or baking, to apply a second or top coat. The primer coat is characterized by a high pigment volume concentration, a low gloss, and good adhesion to the metal surface. In contrast, the top coat has a lower pigment volume concentration and a higher gloss. The function of the top coat, therefore, is to contribute to the color and appearance of the equipment. This two-coat system is expensive due to the increased material usage and processing time and it has, therefore, been an objective of the paint industry to develop a one-coat system which would serve both purposes.

One of the objects of this invention is to provide a protective coating composition which by a single application combines good appearance characteristics with corrosion resistance.

Another object of the invention is to provide a protective coating composition offering to metal surfaces on which it is applied superior resistance to oxidation and attack caused by salt spray or immersion in salt solution.

According to the electrochemical theory of corrosion, when an iron surface is in contact with a suitable electrolyte, such as salt water, iron dissolves as ferrous ion liberating two electrons for each iron atom entering the solution. These electrons then react with hydrogen ions to liberate hydrogen gas. The point at which the ferrous ions enter the solution is called the anode and that at which electrons are consumed, the cathode. Electric current which is created by the corrosion reaction flows through a circuit as follows: (1) through the metal from anode to cathode, (2) across the metal-solution interface, and (3) through the solution (electrolyte).

Two methods which are used to prevent corrosion are: (1) a barrier is placed between the metal surface and the electrolyte to stop the flow of electrons across the interface; (2) a metal which will release electrons more readily than iron is placed in contact with iron.

An insulating coating over the iron may be used in carrying out the first method. In following the second method, a metal such as aluminum placed near the iron serves as a "sacrificial" anode. This latter method is frequently referred to as cathodic protection. Metals which are above iron in the electromotive series can, theoretically, be used as sacrificial anodes.

One of the difficulties in the use of cathodic protection of iron is that during the formation of hydrogen gas hydroxyl ions accumulate at the iron-solution interface. Evidence of this is the formation of blisters and gradual degradation of the protective coating. In order to avoid the formation of hydroxyl ions, aluminum is not used in the primer coat but only in the top coat. Consequently, when aluminum is used as the sacrificial anode, it has been necessary to use two coats.

The coating composition of the present invention has aluminum dispersed therein but, in spite of this component, the composition may be used as a primer coat without favoring the formation of hydroxyl ions and the blisters which result therefrom. The resin of this invention is the reaction product of a mixture of 10%–20% by weight glycerin; 30%–40% by weight of phthalic anhydride; 18%–30% by weight rosin; 15%–25% by weight of drying oil; and 2%–6% by weight of ethylene glycol. Obviously, a proportion in the low range of some of the above ingredients must be compensated for by a proportion in the high range of some of the other components. When the above ingredients are heated in a reaction vessel, the phthalic anyhdride reacts with glycerin and ethylene glycol (and to a slight extent with some of the drying oil and rosin components) to form polyesters. The time for this reaction to proceed to completion can extend over a considerable period of hours as is well known to skilled chemists. The reaction temperature may be gradually raised as the reaction proceeds to a temperature of the order of about 200°–250° centigrade.

Excellent results have been obtained from a mixture of about equal parts of soya oil and oiticica oil as the drying oil. Rosin is a very important component of the mixture as it not only provides a desired degree of surface hardness when the product is applied as a coating material but, in addition, has a high acid number which appears to be an important factor in retarding the formation of hydroxyl ions at the interface of the iron and coating material. Standard grades of rosin obtained as a distillate from pine stumps are satisfactory for use in accordance with the present invention.

In adjusting the composition within the above specified ranges, it is desirable that the phthalic anhydride and glycerin-ethylene glycol components be present in approximately stoichiometric ratios. A preferred composition within the above range is as follows:

| Component: | Percent by weight |
|---|---|
| Soya oil | 12 |
| Oiticica oil | 12 |
| Glycerin | 16 |
| Phthalic anhydride | 33 |
| Rosin | 23 |
| Ethylene glycol | 4 |

The reaction is preferably carried out at 190° C. for 1½ hours, 190°–250° C. for 2½ hours, and at 250° C. for about 4 hours.

To the reaction product described above there is added finely divided non-leafing aluminum on the basis of one to three pounds of aluminum metal per gallon of resin solution. The aluminum is preferably in the form of flakes prepared from thin aluminum foil broken or cut into pieces capable of passing through a 300-mesh screen. It is desirable that about 99% of the aluminum particles be capable of passing through a 325-mesh screen. Particle sizes which will pass through such a screen fall within a surface diameter range of 0.5 to 50 microns. Flakes or platelets of this size will tend to become oriented in parallel planes when they are suspended in the above resin composition and applied as a protective coating. These aluminum particles readily form a paste when suspended in 30%–35% by weight of petroleum spirits. In this paste form, the aluminum can be readily handled and the spread of aluminum dust is avoided.

The aluminum sheet employed in the manufacture of aluminum pigment ordinarily contains small amounts of iron, copper, and silicon. These elements form compounds with aluminum which are blue to gray in color and they are responsible for giving commercial aluminum its bluish tinge. Such metallic impurities may be present in amounts from 0.5% to 1.0%.

The aluminum powder will also contain several percent of aluminum oxide which develops from the oxidation of the surface of the sheets and flakes during the milling process. This oxide film is not detrimental. In fact, we prefer the aluminum flakes to contain a surface layer of oxide.

The particle size distribution of a non-leafing paste is extremely important. It is desirable that the particle size distribution be controlled so that there are very few large particles and a minimum quantity of small ones.

A leafing type aluminum pigment is one which when dispersed in a suitable liquid has the ability to orient and concentrate its particles at the surface of the liquid. This property is conferred on the aluminum by the deposition of a film of stearic acid on each particle during the milling process. This film may be monomolecular or several molecules thick depending on the amount of stearic acid used. A leafing type aluminum pigment is not satisfactory in the practice of this invention.

A non-leafing type aluminum pigment will on dispersion in a suitable medium distribute its particle uniformly throughout the body of the medium. Stearic acid is not used as the lubricant in the manufacture of this type of aluminum pigment. It is the non-leafing pigment which is specified for use in this invention.

Conventional aliphatic and aromatic hydrocarbon solvents such as mineral spirits, high-flash-point naphtha, benzene, xylene, etc., are satisfactory for use in conjunction with the coating composition of this invention. The use of cobalt naphthenate as a drier is also desirable. A typical coating composition ready for use consists of 41.4% by weight of the resin, 18.0% by weight of aluminum paste (65% aluminum in 35% petroleum spirits), 0.2% by weight cobalt naphthenate; and 40.4% naphtha. This composition may be applied to a work piece by spraying or dipping. The work piece is then baked for a period of the order of 7 minutes at a temperature of the order of 150° C.

A single application of the coating composition of this invention confers superior corrosion-resistant properties while at the same time providing good appearance characteristics. Steel test panels have withstood salt spray and immersion tests of several thousand hours duration with no sign of blistering or oxidation.

While the invention has been described with reference to certain specific embodiments thereof, it is obvious that many variations which are still within the spirit of the invention are possible. Therefore, it is the intention that the invention should not be limited except as may be necessitated by the scope of the appended claims.

What I claim as new and desire to secure by Letters Patent of the United States is:

1. A protective coating composition comprising the product obtained from reacting 10% to 20% by weight of glycerin, 30% to 40% by weight of phthalic anhydride, 18% to 30% by weight of rosin, and 15% to 25% by weight of drying oil, to which said product there has been added from one to three pounds of finely divided non-leafing aluminum particles per gallon, the said aluminum particles being of a size to pass through a 300-mesh screen.

2. A composition as claimed in claim 1 wherein the drying oil is a mixture of soya oil and oiticica oil.

3. A composition as claimed in claim 1 wherein the aluminum particles are in the form of flakes prepared from aluminum sheeting.

4. A protective coating composition comprising the product obtained from reacting 12% by weight of soya oil, 12% by weight of oiticica oil, 16% by weight of glycerin, 35% by weight of phthalic anhydride, 23% by weight of rosin, and 4% by weight of ethylene glycol, in which said product there is suspended from one to three pounds per gallon of aluminum flakes capable of passing through a 325-mesh screen.

5. A composition as claimed in claim 4 dissolved in 40% by weight of a hydrocarbon solvent with about 0.2% of cobalt naphthenate drier present.

References Cited in the file of this patent
UNITED STATES PATENTS

| | | |
|---|---|---|
| 2,101,792 | Ellis | Dec. 7, 1937 |
| 2,181,054 | Hampton | Nov. 21, 1939 |
| 2,574,659 | Prislin | Nov. 13, 1951 |
| 2,642,404 | Pike | June 16, 1953 |